United States Patent
Kim et al.

(10) Patent No.: US 10,913,415 B2
(45) Date of Patent: Feb. 9, 2021

(54) BUMPER BEAM FOR A VEHICLE

(71) Applicants: HYUNDAI MOTOR COMPANY, Seoul (KR); LOTTE CHEMICAL CORPORATION, Seoul (KR); AUTOMOBILE INDUSTRIAL ACE, Ansan-si (KR); KIA MOTORS CORPORATION, Seoul (KR)

(72) Inventors: Hyun Kyung Kim, Hwaseong-si (KR); Jeong Min Cho, Suwon-si (KR); Byungkyu Yoon, Uiwang-si (KR); Taegbong Cho, Incheon (KR); Jong Wook Lee, Daejeon (KR); Won Seock Kim, Daejeon (KR); Kyo Min Lee, Daejeon (KR); You Jung Lee, Daejeon (KR); Yeun Hee Hwang, Daejeon (KR)

(73) Assignees: Hyundai Motor Company, Seoul (KR); Kia Motors Corporation, Seoul (KR); Lotte Chemical Corporation, Seoul (KR); Automobile Industrial Ace, Ansan-si (KR)

( * ) Notice: Subject to any disclaimer, the term of this patent is extended or adjusted under 35 U.S.C. 154(b) by 0 days.

(21) Appl. No.: 16/213,711

(22) Filed: Dec. 7, 2018

(65) Prior Publication Data
US 2019/0299888 A1  Oct. 3, 2019

(30) Foreign Application Priority Data

Mar. 30, 2018  (KR) .......................... 10-2018-0037475

(51) Int. Cl.
*B60R 19/03*  (2006.01)
*B60R 19/18*  (2006.01)

(52) U.S. Cl.
CPC .............. *B60R 19/03* (2013.01); *B60R 19/18* (2013.01); *B60R 2019/1853* (2013.01)

(58) Field of Classification Search
CPC . B60R 19/03; B60R 19/18; B60R 2019/1806; B60R 2019/1833; B60R 2019/1853
USPC ................................................. 293/102, 120
See application file for complete search history.

(56) References Cited

U.S. PATENT DOCUMENTS

| 4,733,894 A * | 3/1988 | Lamparter .............. B60R 19/18 293/120 |
| 10,351,085 B2 * | 7/2019 | Munjurulimana ...... B60R 19/18 |
| 2010/0035498 A1 * | 2/2010 | Lundmark .......... C08L 23/0815 442/181 |
| 2010/0109354 A1 * | 5/2010 | Agrahari ................ B60R 19/18 293/120 |

(Continued)

FOREIGN PATENT DOCUMENTS

KR  10-2015-0044187 A  4/2015

*Primary Examiner* — Joseph D. Pape
(74) *Attorney, Agent, or Firm* — Slater Matsil, LLP

(57) ABSTRACT

A bumper beam for a vehicle is attached to a front or rear portion of the vehicle, includes a beam main body having a front surface opposite to a surface to be attached to the vehicle, the front surface being curved outwardly, and the beam main body having a C-shaped section opened outwardly toward the front surface, and stay portions formed on both sides of the beam main body, each of the stay portions having an opening at a rear surface thereof. The beam main body includes a fiber reinforced plastic.

20 Claims, 10 Drawing Sheets

(56) References Cited

U.S. PATENT DOCUMENTS

2016/0167609 A1\* 6/2016 Corwin ................... B60R 19/03
                                                              293/120
2017/0253204 A1\* 9/2017 Venkat .................... B60R 19/18

\* cited by examiner (a)

(b)

BUMPER BEAM FOR A VEHICLE

CROSS-REFERENCE TO RELATED APPLICATION

This application claims priority to and the benefit of Korean Patent Application No. 10-2018-0037475 filed in the Korean Intellectual Property Office on Mar. 30, 2018, the entire contents of which are incorporated herein by reference.

BACKGROUND

(a) Field

The present disclosure relates to a bumper beam for a vehicle. More particularly, the present disclosure relates to a bumper beam for a vehicle having excellent mechanical strength and light weight.

(b) Description of the Related Art

A bumper system for a vehicle is designed to elastically deform at the time of low-speed collision of a vehicle to minimize the physical damage of the vehicle. It absorbs the impact when it collides with other vehicles and/or fixed structures. It is also a buffering means arranged at the front and rear of the vehicle so as to minimize the deformation of the vehicle body.

According to each country's regulations on carbon emission rights regulation, the automobile industry is actively conducting research on carbon emission reduction through fuel efficiency reduction. As part of this vehicle weight reduction, the rear bumper beam of the vehicle is also being weight-reduced. In particular, regarding the bumper beam according to general specifications (China, India, Southeast Asia etc.) which do not require the RCAR test (research council for automobile repairs test, the most severe of the low-speed collision tests), the automobile market demands very high weight saving.

Korean Patent Laid-Open Publication No. 2015-0044187 (published on Apr. 24, 2014, entitled "Hybrid prepreg for automobile bumper and automobile bumper manufactured therefrom") discloses the related technologies.

The above information disclosed in this Background section is only for enhancement of understanding of the background of the invention and therefore it may contain information that does not form the prior art that is already known in this country to a person of ordinary skill in the art.

SUMMARY

One aspect of the present invention provides a bumper beam for a vehicle which is excellent in light weight and excellent in mechanical rigidity.

Another aspect of the present invention provides a bumper beam for a vehicle that can minimize deformation during impact.

Still another aspect of the present invention provides a bumper beam for an automobile having excellent economy.

A further aspect of the present invention provides a bumper beam for a vehicle. In one embodiment, a bumper beam for a vehicle is attached to a front or rear portion of the vehicle, and includes a beam main body having a front surface opposite to a surface to be attached to a vehicle and curved outwardly and having a C-shaped section opened outwardly toward the front surface, and stay portions formed on both sides of the beam main body, and having an opening at a rear surface thereof, wherein the beam main body includes a fiber reinforced plastic.

In one embodiment, the bumper beam for a vehicle may further includes a main body rib portion including a horizontal rib portion disposed in parallel with the upper and lower walls of the beam main body portion at an inner side of the beam main body portion, vertical rib portions orthogonal to the horizontal rib portion and connecting upper and lower walls of the beam main body portion, and inclined rib portions connected to at least one of an upper wall and a lower wall of the beam main body portion, and the horizontal rib portion, and at which an inclination surface is formed.

In one embodiment, the horizontal rib portion may be made of a fiber reinforced plastic.

In one embodiment, the stay portions may have an opening formed on the rear surface thereof, and a beam receiving portion having a hollow interior is formed.

In one embodiment, the side surface of the stay portions may be formed in a structure in which the inside is H type section.

In one embodiment, both side surfaces of the beam body portion may be formed with a straight inclined surface.

In one embodiment, the fiber reinforced plastic may be a continuous fiber impregnated with a matrix resin, the specific gravity of the fiber reinforced plastic may be 0.5 to 1.5, the continuous fiber may include at least one of carbon fiber, glass fiber and polyamide fiber, and the matrix resin may include at least one of epoxy resin, polyether ketone resin, polyether ether ketone resin, polyester resin, polyethylene resin, polypropylene resin, polyethylene terephthalate resin, polyamide resin, polycarbonate resin and polybutylene terephthalate resin.

In one embodiment, at least one of the stay portions, the vertical rib portions, and the inclined rib portion may be formed by including at least one of a fiber reinforced plastic and a thermoplastic resin composition, and the thermoplastic resin composition may be formed by molding polypropylene, talc, mineral oil and rubber.

The bumper beam according to embodiments of the present invention is excellent in light weight, excellent in mechanical rigidity, minimizes deformation such as intrusion and deflection at the time of collision, and is excellent in economy.

DESCRIPTION OF SYMBOLS

Figure 1:
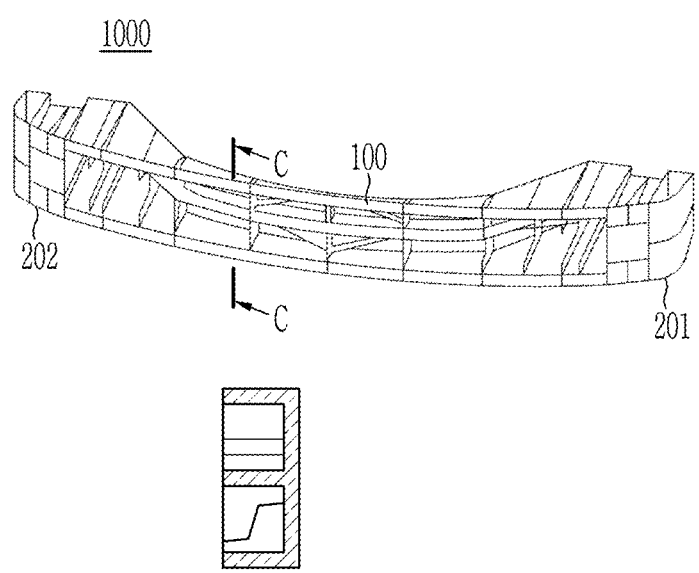
FIG. 1 shows a bumper beam for a vehicle according to one embodiment of the present invention.

100: beam main body 101: upper wall of beam main body
102: lower wall of beam main body 103, 104: straight inclined surface
110: horizontal rib portion
120, 120a, 120b, 120c, 120d, 120e, 120f, 120g, 120h: inclined rib portion
130, 130a, 130b, 130c, 130d, 130e: vertical rib portion
201, 202: stay portion 1000: bumper beam for a vehicle

DETAILED DESCRIPTION OF EMBODIMENTS

In describing embodiments of the present invention, a detailed description of known functions or constructions related to embodiments of the present invention may be omitted if it is deemed that they would make the gist of the present invention unnecessarily vague.

The terms used herein are defined according to the functions of embodiments of the present invention and may vary depending on a user's or an operator's intension and usage. Therefore, the terms used herein should be understood based on the descriptions made herein In this specification, "upper" and "lower" are defined in the drawings, depending on the point of view, "upper" may be changed to "lower" and "lower" may be changed to "upper", and the terms "up" or "on" may include not only directly but also intervening structures. On the other hand, what is referred to as "directly on" or "directly above" means that no other structure is interposed in between.

In the present specification, the term "front surface" means a surface to which impact is directly applied, and "rear surface" means a surface opposite to the front surface. Further, in the present specification, the C-shaped structure means a structure in which one side is open in its cross section.

Hereinafter, embodiments of the present invention will be described in detail with reference to the accompanying drawings.

Typical application of the low specific gravity material and the flesh reduction technique of the local areas show weight reduction, but provides low product performance, and there was a limitation in weight reduction.

One aspect of the invention relates to a bumper beam for a vehicle. FIG. 1 shows a bumper beam for a vehicle according to one embodiment of the present invention, FIG. 2 is a rear view of a bumper beam for a vehicle according to one embodiment of the present invention, FIG. 3 is a top view of a bumper beam for a vehicle according to one embodiment of the present invention, FIG. 4 is a side view of a stay portion of a bumper beam for a vehicle according to one embodiment of the present invention, FIG. 5 is a front view of a bumper beam for a vehicle according to one embodiment of the present, and FIG. 6 shows a main body rib portion of a bumper beam for a vehicle according to one embodiment of the present.

Figure 2:
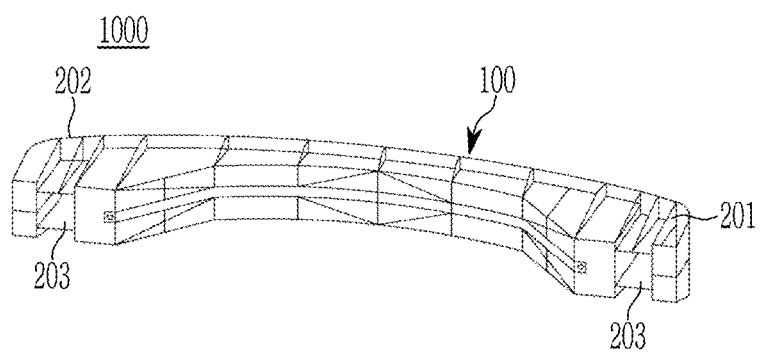
FIG. 2 is a rear view of a bumper beam for a vehicle according to one embodiment of the present invention.
Figure 3:
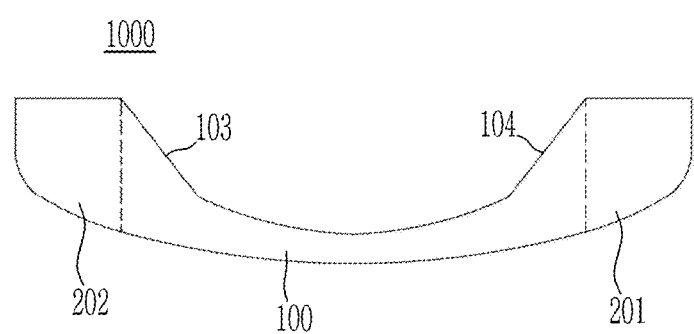
FIG. 3 is a top view of a bumper beam for a vehicle according to one embodiment of the present invention.
Figure 4:
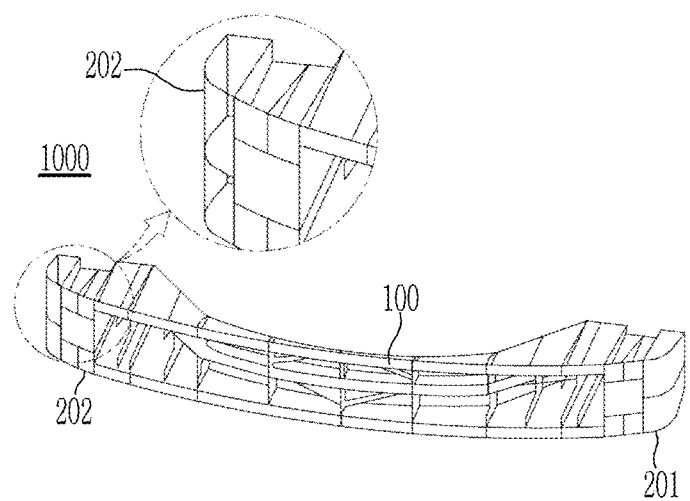
FIG. 4 is a side view of a stay portion of a bumper beam for a vehicle according to one embodiment of the present invention.

Referring to FIG. 1 to FIG. 3, the bumper beam 1000 for a vehicle, is a bumper beam which is attached to a front or rear portion of the vehicle, and includes a beam main body 100 having a front surface opposite to a surface to be attached to the vehicle. The front surface is curved outwardly. In a section taken along a vertical line, the main body 100 has a C-shaped section being opened outwardly toward the front surface. The bumper beam 100 further includes stay portions 201 and 202 formed on both sides of the beam main body 100, and having an opening at a rear surface thereof. The beam main body 100 includes a fiber reinforced plastic. In one embodiment, the stay portions 201 and 202 may be integrally formed on both sides of the beam main body 100.

In one embodiment, the bumper beam woo may further include a main body rib portion including a horizontal rib portion no, vertical rib portions 13oa to 13oe and inclined rib portions 12oa to 12oh. The horizontal rib portion no is disposed in parallel with the upper and lower walls of the beam main body portion 110 at an inner side of the beam main body portion 100. The vertical rib portions 13oa to 13oe are orthogonal to the horizontal rib portion 110 and connect upper and lower walls of the beam main body portion 100. Each of the inclined rib portions 12oa to 12oh is connected to one of an upper wall and a lower wall of the beam main body portion 100, and the horizontal rib portion 100, and at which an inclination surface is formed.

Figure 5:
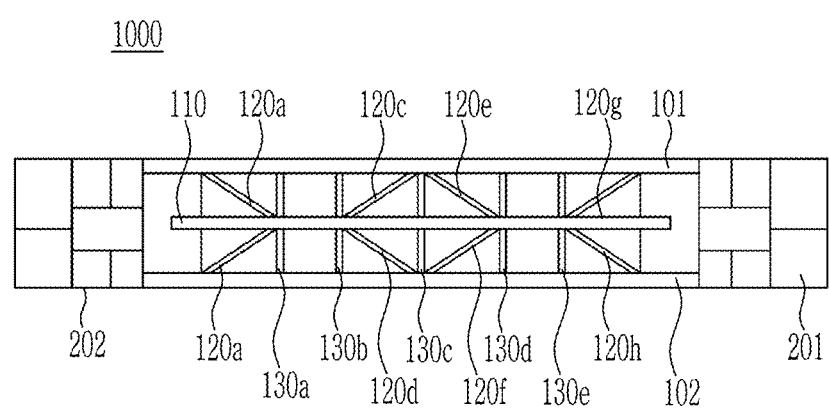
FIG. 5 is a front view of a bumper beam for a vehicle according to one embodiment of the present.
Figure 6:
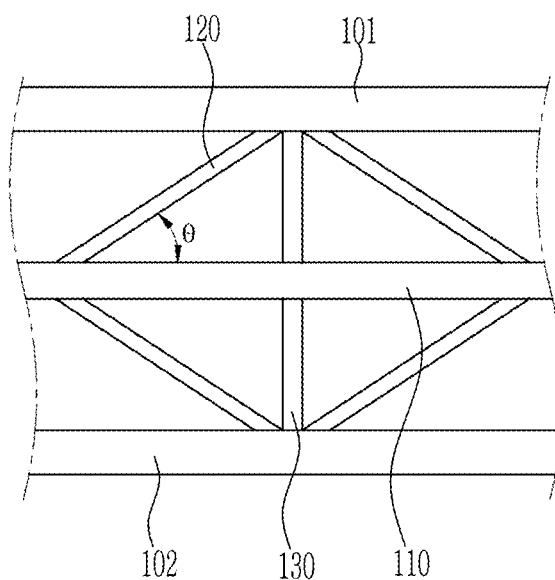
FIG. 6 shows a main body rib portion of a bumper beam for a vehicle according to one embodiment of the present.

Referring to FIG. 5 and FIG. 6, when including the inclined rib portions 120a to 120h, the mechanical strength of the bumper beam 1000 is improved and the bending resistance of the bumper beam 1000 can be excellent at the time of collision. In one embodiment, the angle θ formed by the inclined rib portions and the horizontal rib portion may be 5° to 85°. When formed in the above range, the bumper beam has excellent bending resistance at the time of collision, and distortion and cracks can be minimized. For example, the angle θ may be 30° to 60°.

Referring to FIG. 3, the outer surfaces of the stay portions 201 and 202 can be rounded. Under the above conditions, deformation and cracking of the bumper beam can be minimized during an external impact.

Referring to FIG. 3, straight inclined surfaces 103 and 104 may be formed on both sides of the rear surface of the beam main body 100. When forming the straight inclined surfaces 103 and 104, deformation and cracking of the bumper beam can be minimized during an external impact.

Referring to FIG. 2, in embodiments, each of the stay portions 201 and 202 may have an opening formed on the rear side thereof and a beam receiving portion 203 formed therein hollow. In one embodiment, the opening may be formed in a rectangular box shape. Under the above conditions, deformation and cracking of the bumper beam can be minimized upon impact.

FIG. 4 is a side view of a stay portion of a bumper beam for a vehicle according to one embodiment of the present invention. Referring to FIG. 4, in one embodiment, the side surface of the stay portions 201 and 202 is formed in a structure in which the inside is H type section. When the side surface is formed under the above conditions, the strike area is increased, so that cracking of the beam can be minimized during a side impact of the bumper beam.

The beam main body includes a fiber reinforced plastic. When forming the beam main body by using the fiber reinforced plastic, both the light weight characteristic and mechanical strength can be excellent.

In one embodiment, the horizontal rib portion may be made of a fiber reinforced plastic. When the horizontal rib portion 110 is formed by using the fiber reinforced plastic, cracking of the beam can be minimized during side impact of the bumper beam. In one embodiment, the horizontal rib portion 110 may be formed by stacking a plurality of unit layers formed by molding a fiber reinforced plastic.

In one embodiment, the specific gravity of the fiber reinforced plastic may be 0.5 to 1.5. Under these conditions, light weight and mechanical strength can be excellent at the same time.

In one embodiment, the fiber reinforced plastic is a continuous fiber impregnated with a matrix resin, and the continuous fiber may include at least one of carbon fiber, glass fiber and polyamide fiber. For example, the continuous fibers according to embodiments of the present invention may include a plurality of filaments and in the form of a fiber tow, which is a bundle of untwisted fibers.

In this specification, the continuous fiber may mean a continuous fiber having a length of 5 mm or more, or a fiber bundle.

In one embodiment, the matrix resin may include at least one of epoxy resin, polyether ketone resin, polyether ether ketone resin, polyester resin, polyethylene resin, polypropylene resin, polyethylene terephthalate resin, polyamide resin, polycarbonate resin and polybutylene terephthalate resin.

In one embodiment, the continuous fibers may be in the form of plain weave, twill weave, satin weave or non-crimping fabric (NCF). In one embodiment, the non-crimping fabric is fabricated into a fabric through a stitching process by arranging the yarn in one layer or a plurality of layers so that the arranged yarn is fixed and a crimp of the fabric is not generated. The non-crimping fabric may have an arrangement such as uni-direction (UD) or biaxial (2-axial).

The diameter of the continuous fibers may be 0.01 mm to 5 mm. In the above range, the light weight of embodiments of the present invention is excellent, and the rigidity can be simultaneously excellent.

In one embodiment, the fiber reinforced plastic may be formed by laminating a plurality of prepregs preliminarily impregnated or coated with a matrix resin to continuous fibers arranged in one direction, followed by press molding. In this case, the fiber laminate can have easy moldability and excellent shock absorption ability.

For example, when a polypropylene resin is used as the matrix resin, the elasticity and impact resistance of the prepreg are further improved, and the crack prevention effect of the bumper beam can be further improved. In one embodiment, the prepreg can comprise from 20 to 80 weight percent matrix resin and from 20 to 80 weight percent continuous fiber. In the above range, it is possible to further improve the impact absorbing ability against the lightening degree.

In one embodiment, the thickness of the prepreg layer may be 0.1 mm to 1 mm, for example, 0.25 mm to 0.30 mm. Within the above range, when fabricated as a fiber laminate, the elasticity and impact resistance are excellent, but the flexibility is maintained, thereby further improving the crack prevention effect of the bumper beam.

The continuous fiber may be, for example, a yarn or a fiber. One fiber cross-section of the continuous fibers may have a long diameter of 5 mm to 15 mm, a short diameter of 0.1 mm to 0.3 mm, and an aspect ratio of 1:1 to 1:120. For example, the continuous fibers may have a long diameter of 8 mm to 10 mm, a short diameter of 0.15 mm to 0.25 mm, and an aspect ratio of 1:30 to 1:70. The effect of preventing or inhibit the bumper beam from cracking and breaking within the above range is more excellent, and the impact absorption efficiency can be further improved.

In one embodiment, the continuous fibers may be formed at an orientation angle of 0°, 45°, and 90°. The orientation angle may be an angle formed by the weave pattern of the continuous fiber or continuous fiber bundle (or continuous fiber tow).

In one embodiment, the fiber reinforced plastic may be formed by alternately laminating prepreg layers containing continuous fibers having the same orientation angle or different from each other, and then pressing them.

The bumper beam according to embodiments of the present invention is excellent in light weight, has excellent mechanical rigidity, minimizes deformation upon collision, and can be economically excellent.

In one embodiment, at least one of the stay portions, the vertical rib portions, and the inclined rib portions may be formed by including at least one of a fiber reinforced plastic and a thermoplastic resin composition.

For example, the thermoplastic resin may be a polyamide resin, a polybutylene terephthalate resin, a polyolefin resin, a thermoplastic polyolefin composite resin (TPO), a reinforced polyolefin resin, or the like. The reinforced polyolefin resin may be a polyolefin resin reinforced with glass fiber or the like.

In one embodiment, at least one of the stay portions, the vertical rib portions, and the inclined rib portions may be formed to include polypropylene, talc, mineral oil, and rubber. When the above components are included, the moldability, stretching properties and elastic restoration properties are excellent, and the rupture deformation of the bumper beam at the time of collision can be minimized. For example, at least one of the stay portions, the vertical rib portions, and the inclined rib portions may be formed by molding a first thermoplastic resin composition including polypropylene, talc, mineral oil, and rubber. The first thermoplastic resin composition has excellent stretch properties and elastic restitution properties when the main body rib portion is formed, so that the rupture deformation of the bumper beam at the time of collision can be minimized.

For example, the stay portions, the vertical rib portions, and the inclined rib portions may be formed by injection molding a first thermoplastic resin composition containing 100 parts by weight of polypropylene and 20 to 100 parts by weight of talc, mineral oil and rubber. When included in the above content range, the elastic restoration property is excellent, so that the rupture deformation of the bumper beam at the time of impact can be minimized.

Hereinafter, the configuration and operation of embodiments of the present invention will be described in more detail. It is to be understood, however, that the same is by way of illustration and example only and is not to be construed as limiting the invention in any way.

EXAMPLES

A bumper beam for a vehicle as shown in FIG. 1 was prepared. Specifically, a bumper beam including a beam main body having a front surface opposite to a surface to be attached to a vehicle and curved outwardly and having a C-shaped section opened outwardly toward the front surface, stay portions formed on both sides of the beam main body, and having an opening at a rear surface thereof, and a main body rib portion including a horizontal rib portion disposed in parallel with the upper and lower walls of the beam main body portion at an inner side of the beam main body portion, vertical rib portions orthogonal to the horizontal rib portion and connecting upper and lower walls of the beam main body portion, and inclined rib portions connected to at least one of an upper wall and a lower wall of the beam main body portion, and the horizontal rib portion, and at which an inclination surface is formed was prepared. Further, a straight inclined surface is formed at both side surfaces of the beam body portion.

At this time, the stay portion includes a rectangular box-shaped opening at the rear side, and a beam receiving portion which hollow inside is formed. As shown in FIG. 4, the side surfaces of the stay portions were formed so as to have an H-shaped cross section inside.

The beam main body and the horizontal rib portion were fabricated using a fiber reinforced plastic in which continuous fibers (carbon fibers) were impregnated into a matrix resin (epoxy resin), and the stay portions, the vertical rib portions and the inclined rib portions were produced by injecting a thermoplastic resin composition having a specific gravity of 1.00±0.05, which was obtained by adding talc, mineral oil and rubber to polypropylene.

The center collision, offset collision, and corner collision test were carried out using the pendulum test equipment (Lotte Chemical Co., Ltd. testing equipment) for the bumper beams manufactured in the above examples, and the results are shown in Table 1 below.

(1) Center collision test: The center of the vehicle (80% of tolerance weight 1, 250 kg) was collided with the center of the bumper beam at a speed of 2.7 mi/h (parallel to the vehicle traveling direction) with a 1,000 kg impact sieve.

(2) Offset collision Test: The collision was made by moving the center of the vehicle (80% of tolerance weight 1, 250 kg+75 kg adult 3 passenger weight) to 300 mm in the center direction of the bumper beam at a speed of 2.7 mi/h with a 1, 180 kg impact body.

(3) Corner collision test: The center of the vehicle (80% of tolerance weight 1, 250 kg+75 kg adult 3 passenger weight) was impacted at a speed of 1.5 mi/h in the corner direction of the bumper beam with an impacting body of 1, 180 kg.

In Table 1 above, the intrusion (Int) criterion for the center and offset collision test is 157.2 mm and the penetration criterion for the corner collision test is 103 mm.

Figure 7:
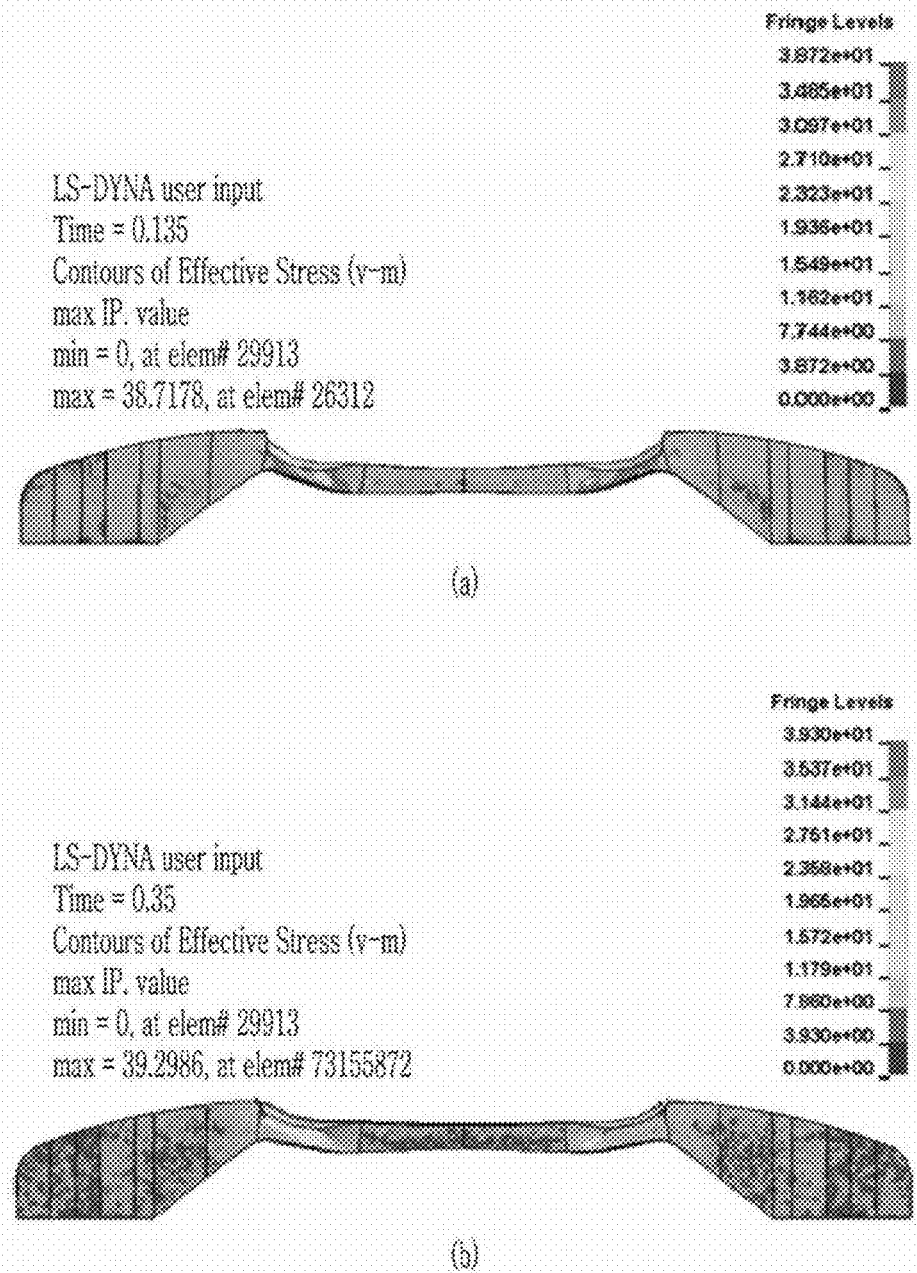
FIG. 7 shows (a) a stress variation of a bumper beam when a pendulum is struck at the center of a bumper beam according to one embodiment of the present invention, and (b) the stress variation of the bumper beam after the pendulum strikes the center of the bumper beam of the embodiment.

FIG. 7 shows (a) a stress variation of a bumper beam when a pendulum is struck at the center of a bumper beam according to an embodiment of the present invention, and (b) the stress variation of the bumper beam after the pendulum strikes the center of the bumper beam of the embodiment. Referring to results of the Table 1 and FIG. 7, when the pendulum was strike at the center of the bumper beam, the center striking area was deformed, but the side inclined portion of the bumper beam supported the load while maintaining the existing shape due to the fiber reinforced plastic material and the curvature structure. Also, after the pendulum striking, it was found that only a small residual deformation due to the elastic restoring force was present after the load was removed due to the high load holding force at the time of striking.

Figure 8:
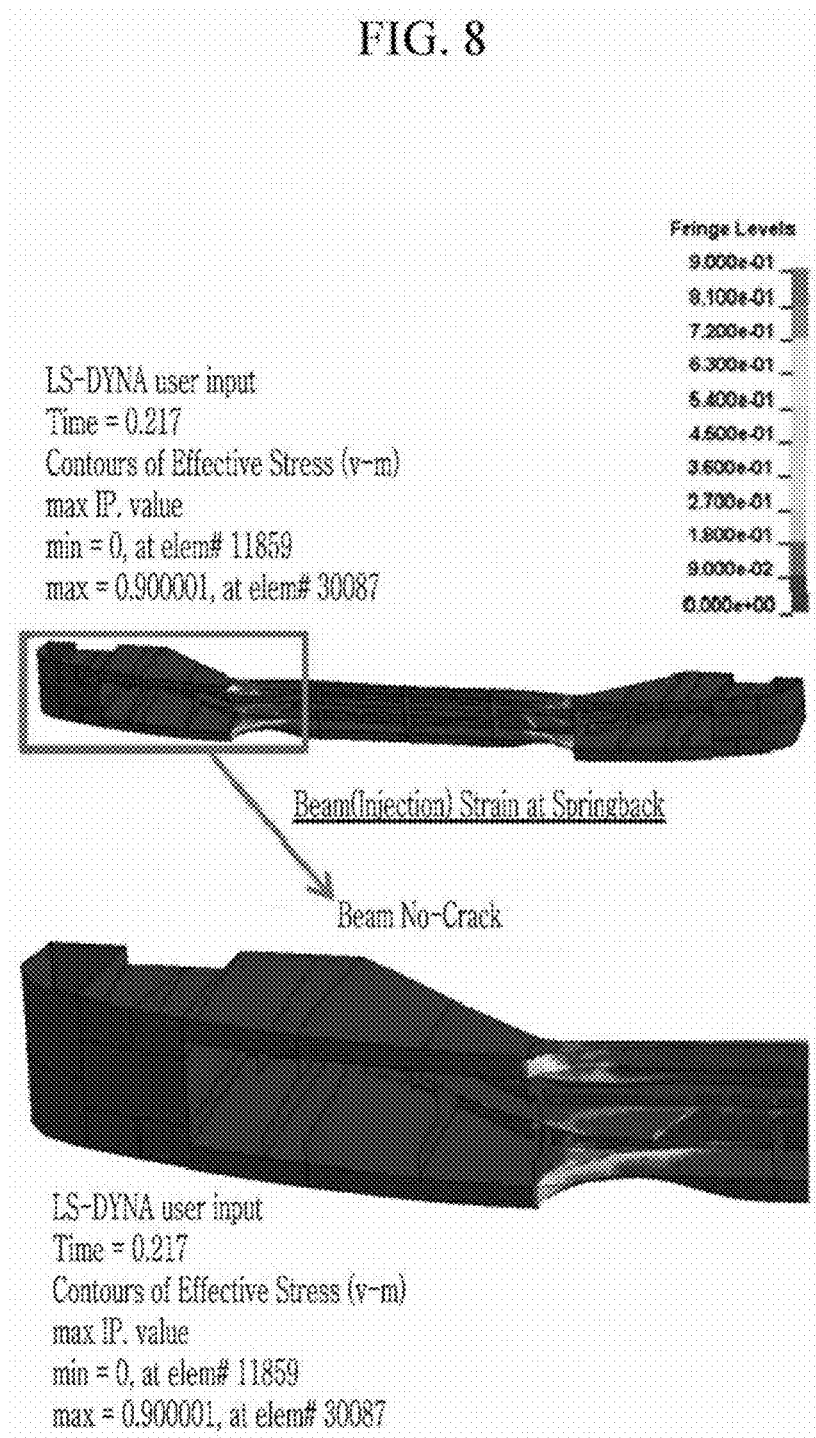
FIG. 8 shows the strain variation of the bumper beam after completion of the pendulum impact in the center of the bumper beam according to one embodiment of the present invention.

FIG. 8 shows the strain variation of the bumper beam after completion of the pendulum impact in the center of the bumper beam according to one embodiment of the present invention. Referring to FIG. 8, it was found that the fracture occurred only in the local region due to the high elongation (90%, tensile test speed of 50 mm/min applied) of the main body rib portion of the present invention.

Figure 9:
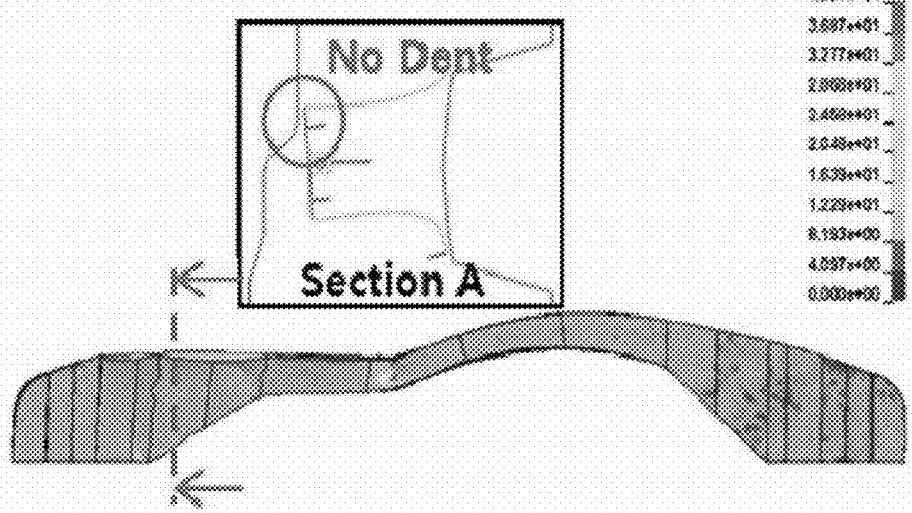
FIG. 9 illustrates (a) the stress variation of the bumper beam upon offset bombardment for a bumper beam according to one embodiment of the present invention, and (b) the stress variation of the bumper beam after completion of offset bombardment with the bumper beam of the embodiment.
Figure 9:
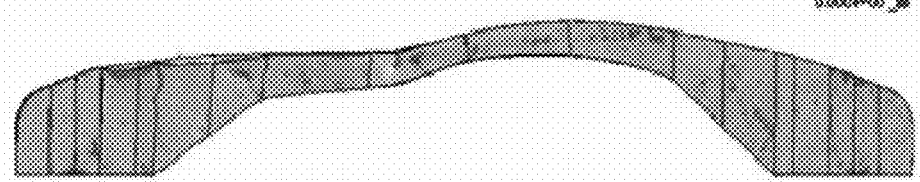

FIG. 9 illustrates (a) the stress variation of the bumper beam upon offset bombardment for a bumper beam of one embodiment of the present invention, and (b) the stress variation of the bumper beam after completion of offset bombardment with the bumper beam of the embodiment. Referring to results of the Table 1 and FIG. 9, the bumper beam of the embodiment was deformed while maintaining only the offset striking portion due to the application of the fiber reinforced plastic material and the curvature structure and satisfied the non-contact condition with the rear side back panel (body part) of the bumper beam. Also, after the offset striking, there was only a small residual deformation due to the elastic restoring force after the load was removed due to the high load holding force at the time of striking.

Figure 10:
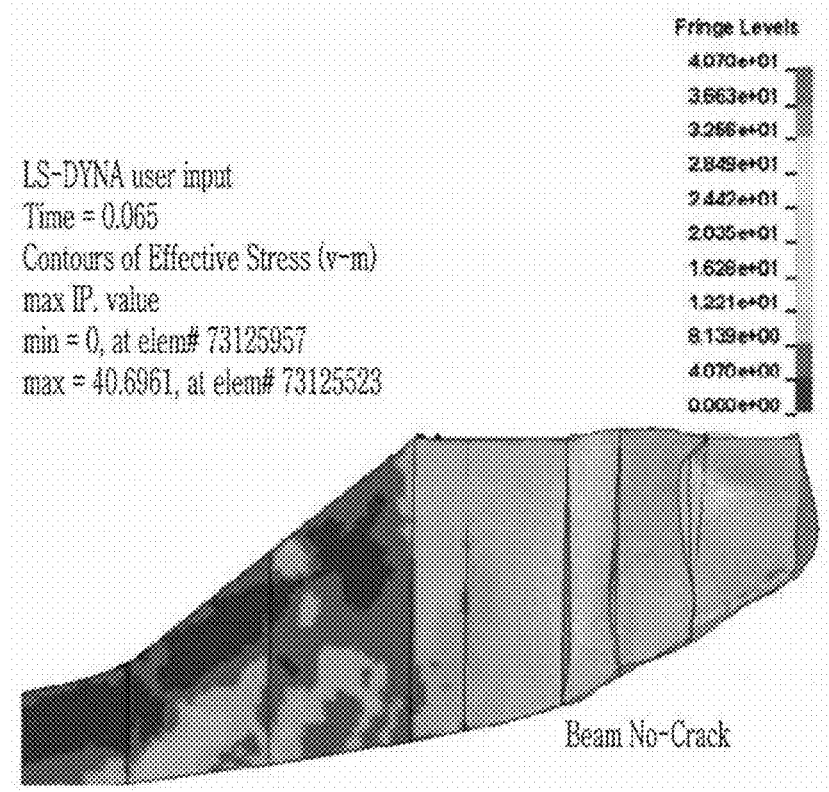
FIG. 10 shows the stress variation of the bumper beam when striking the bumper beam corner portion according to one embodiment of the present invention.

FIG. 10 shows the stress variation of the bumper beam when striking the bumper beam corner portion according to the embodiment of the present invention. Referring to results of the FIG. 10 and Table 1, it was found that cracks were prevented from being generated only by local deformation due to the H shaped section formed on the side surface of the stay portions and the rectangular box-shaped opening structure.

Also, referring to results of the Table 1, in the case of the embodiment of the present invention, it was found that all the specifications, the result of center, offset and corner test, which is the low speed collision test, were satisfied, and that the bumper beam did not crack.

TABLE 1

| Weight (kg) | Measurement | Target spec (mm) | Bumper low speed collision test | | | Specification satisfaction | Beam crack |
| --- | --- | --- | --- | --- | --- | --- | --- |
| | | | 18" (Center) | 18" (Offset) | 18" (Corner) | | |
| 1.49 | Int. | Int: 157.2 (103) | 100.4 (Margin: 156%) | 88.0 (Margin: 179%) | 52.3 (Margin: 197%) | ○ | X |
| | Def. | Def: 109 | 78.2 (Margin: 139%) | 57.1 (Margin: 191%) | — | | |

It will be understood by those skilled in the art that various changes in form and details may be made therein without departing from the spirit and scope of the present invention as defined by the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A bumper beam comprising:
a beam main body having a front surface opposite to a surface to be attached to a vehicle and curved outwardly, the beam main body having a C-shaped section being opened outwardly toward the front surface;
stay portions formed on both sides of the beam main body, each stay portion having an opening at a rear surface thereof;
a horizontal rib portion disposed in parallel with upper and lower surfaces of the beam main body at an inner side of the beam main body;
vertical rib portions disposed orthogonal to the horizontal rib portion and connecting the upper and lower surfaces of the beam main body; and
inclined rib portions connecting one of the upper surface and the lower surface of the beam main body and the horizontal rib portion, the inclined rib portions arranged in a symmetrical shape on both sides based on the horizontal rib portion disposed in a center of the beam main body, wherein an angle formed by the inclined rib portions and the horizontal rib portion is 5° to 85°;
wherein the beam main body includes a fiber reinforced plastic;
wherein the fiber reinforced plastic comprises continuous fibers impregnated with a matrix resin;
wherein the specific gravity of the fiber reinforced plastic is 0.5 to 1.5;
wherein the continuous fibers include at least one of carbon fiber, glass fiber and polyamide fiber; and
wherein the matrix resin includes at least one of epoxy resin, polyether ketone resin, polyether ether ketone resin, polyester resin, polyethylene resin, polypropylene resin, polyethylene terephthalate resin, polyamide resin, polycarbonate resin and polybutylene terephthalate resin.

2. The bumper beam of claim 1, wherein the horizontal rib portion is made of a fiber reinforced plastic.

3. The bumper beam of claim 1, wherein each of the stay portions have a beam receiving portion having a hollow interior.

4. The bumper beam of claim 1, wherein a side surface of the stay portions is formed in a structure having a H shaped section.

5. The bumper beam of claim 1, wherein the beam main body includes two side surfaces and wherein both side surfaces of the beam main body are formed with a straight inclined surface.

6. The bumper beam of claim 1, wherein at least one of the stay portions, the vertical rib portions, and the inclined rib portions is formed of at least one of a fiber reinforced plastic and a thermoplastic resin composition.

7. The bumper beam of claim 6, wherein the thermoplastic resin composition is formed by molding polypropylene, talc, mineral oil and rubber.

8. The bumper beam of claim 1, wherein the angle formed by the inclined rib portions and the horizontal rib portion is between 30° to 60°.

9. The bumper beam of claim 1, wherein the continuous fibers comprises continuous fibers having a length of 5 mm or more.

10. The bumper beam of claim 1, wherein the continuous fibers comprise a fiber bundle.

11. A vehicle comprising:
a vehicle body; and
a bumper beam attached to the vehicle body, the bumper beam comprising:
a beam main body having a front surface opposite to a surface attached to the vehicle body and curved outwardly;
stay portions formed on both sides of the beam main body;
a horizontal rib portion disposed in parallel with upper and lower surfaces of the beam main body at an inner side of the beam main body;
vertical rib portions disposed orthogonal to the horizontal rib portion and connecting the upper and lower surfaces of the beam main body; and
inclined rib portions connecting one of the upper surface and the lower surface of the beam main body and the horizontal rib portion, the inclined rib portions arranged in a symmetrical shape on both sides based on the horizontal rib portion installed in a center of the beam main body, wherein an angle formed by the inclined rib portions and the horizontal rib portion is 5° to 85°;
wherein the beam main body has a C-shaped section being opened outwardly toward the front surface;
wherein each stay portion has an opening at a rear surface thereof;
wherein the beam main body includes a fiber reinforced plastic;
wherein the fiber reinforced plastic comprises continuous fibers impregnated with a matrix resin;
wherein the specific gravity of the fiber reinforced plastic is 0.5 to 1.5;
wherein the continuous fibers include at least one of carbon fiber, glass fiber and polyamide fiber; and
wherein the matrix resin includes at least one of epoxy resin, polyether ketone resin, polyether ether ketone resin, polyester resin, polyethylene resin, polypropylene resin, polyethylene terephthalate resin, polyamide resin, polycarbonate resin and polybutylene terephthalate resin.

12. The vehicle of claim 11, wherein the horizontal rib portion is made of a fiber reinforced plastic.

13. The vehicle of claim claim 11, wherein at least one of the stay portions, the vertical rib portions, and the inclined rib portions is formed of at least one of a fiber reinforced plastic and a thermoplastic resin composition.

14. The vehicle of claim 13, wherein the thermoplastic resin composition is formed by molding polypropylene, talc, mineral oil and rubber.

15. The vehicle of claim 11, wherein each of the stay portions have a beam receiving portion having a hollow interior.

16. The vehicle of claim 11, wherein a side surface of the stay portions is formed in a structure having a H shaped section.

17. The vehicle of claim 11, wherein the beam main body includes two side surfaces and wherein both side surfaces of the beam main body are formed with a straight inclined surface.

18. A bumper beam comprising:
a beam main body including a first fiber reinforced plastic material and having a front surface opposite to a rear surface configured to be attached to a vehicle, the front surface being curved outwardly and both sides of the rear surface having straight inclined surfaces;
stay portions formed on both sides of the beam main body, each stay portion being rounded and having an opening at a rear surface thereof;

a horizontal rib portion disposed in parallel with upper and lower surfaces of the beam main body at an inner side of the beam main body and including a second fiber reinforced plastic material;

vertical rib portions disposed orthogonal to the horizontal rib portion and connecting the upper and lower surfaces of the beam main body; and inclined rib portions connecting one of the upper surface and the lower surface of the beam main body and the horizontal rib portion, the inclined rib portions arranged in a symmetrical shape on both sides based on the horizontal rib portion disposed in a center of the beam main body, wherein an angle formed by the inclined rib portions and the horizontal rib portion is 5° to 85°;

wherein the first fiber reinforced plastic comprises continuous fibers including at least one of carbon fiber, glass fiber and polyamide fiber impregnated with a matrix resin including at least one of epoxy resin, polyether ketone resin, polyether ether ketone resin, polyester resin, polyethylene resin, polypropylene resin, polyethylene terephthalate resin, polyamide resin, polycarbonate resin and polybutylene terephthalate resin; and wherein the specific gravity of the first fiber reinforced plastic is 0.5 to 1.5.

19. The bumper beam of claim 18, wherein the continuous fibers are in at least one of a plain weave, a twill weave, a satin weave, or a non-crimping fabric.

20. The bumper beam of claim 18, wherein one fiber cross-section of the continuous fibers has a long diameter of 5 mm to 15 mm, a short diameter of 0.1 mm to 0.3 mm, and an aspect ratio of 1:1 to 1:120.

\* \* \* \* \*